United States Patent
Mishra et al.

(10) Patent No.: US 9,973,431 B2
(45) Date of Patent: May 15, 2018

(54) SINGLE LINE PMIC-HOST LOW-LEVEL CONTROL INTERFACE

(71) Applicant: QUALCOMM Incorporated, San Diego, CA (US)

(72) Inventors: Lalan Mishra, San Diego, CA (US); Christopher Kong Yee Chun, Austin, TX (US); Chiew-Guan Tan, San Diego, CA (US); Gordon Lee, Gilbert, AZ (US); Todd Sutton, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 14/966,844

(22) Filed: Dec. 11, 2015

(65) Prior Publication Data

US 2017/0171081 A1  Jun. 15, 2017

(51) Int. Cl.
| | |
|---|---|
| *H04L 1/00* | (2006.01) |
| *H04L 12/801* | (2013.01) |
| *H04L 5/14* | (2006.01) |
| *H04L 12/933* | (2013.01) |
| *H04W 28/02* | (2009.01) |
| *H04W 52/02* | (2009.01) |

(52) U.S. Cl.
CPC .............. *H04L 47/12* (2013.01); *H04L 5/14* (2013.01); *H04L 49/109* (2013.01); *H04W 28/0221* (2013.01); *H04W 52/0229* (2013.01)

(58) Field of Classification Search
CPC combination set(s) only.
See application file for complete search history.

(56) References Cited

U.S. PATENT DOCUMENTS

| | | |
|---|---|---|
| 6,034,955 A | 3/2000 | Cho |
| 6,393,576 B1 | 5/2002 | Gates et al. |
| 7,181,557 B1 | 2/2007 | Falik et al. |
| 2004/0049619 A1 | 3/2004 | Lin |
| 2004/0233917 A1 | 11/2004 | Rocas et al. |

(Continued)

FOREIGN PATENT DOCUMENTS

EP  2778937 A2  9/2014

OTHER PUBLICATIONS

International Search Report and Written Opinion—PCT/US2016/061392—ISA/EPO—dated Feb. 21, 2017.

*Primary Examiner* — Frank Duong
(74) *Attorney, Agent, or Firm* — Loza & Loza LLP

(57) ABSTRACT

System, methods, and apparatus are described that facilitate signaling between devices over a single bi-directional line. In an example, the apparatus couples a first device to a second device via a single bi-directional line, indicates initiation of a first action, initiated at the first device, by sending a first single transition on the single bi-directional line from the first device to the second device, and indicates initiation of a second action, initiated at the second device, by sending a second single transition on the single bi-directional line from the second device to the first device. In another example, a first device initiates a first action, indicates initiation of the first action by generating a first event on a single bi-directional line, and receives an indication of a second action initiated at a second device by observing a second event on the single bi-directional line.

30 Claims, 10 Drawing Sheets

(56) References Cited

U.S. PATENT DOCUMENTS

| | | |
|---|---|---|
| 2013/0278421 A1 | 10/2013 | Sutton |
| 2015/0039916 A1* | 2/2015 | Case .................. G06F 1/263 |
| | | 713/310 |
| 2015/0074306 A1 | 3/2015 | Ayyagari et al. |

* cited by examiner

SINGLE LINE PMIC-HOST LOW-LEVEL CONTROL INTERFACE

BACKGROUND

Field

The present disclosure relates generally to high-speed data communications, and more particularly, to systems and methods for signaling between devices using a single bi-directional line.

Background

High-speed interfaces are frequently used between circuits and components of mobile wireless devices and other complex apparatus. For example, certain devices may include processing, communications, storage and/or display devices that interact with one another through communications links. Some of these devices, including synchronous dynamic random access memory (SDRAM), may be capable of providing or consuming data and control information at processor clock rates. Other devices, such as display controllers, may require variable amounts of data at relatively low video refresh rates.

Electronic devices (cellular telephones, wireless modems, computers, digital music players, Global Positioning System units, Personal Digital Assistants, gaming devices, etc.) have become a part of everyday life. Small computing devices are now placed in everything from automobiles to housing locks and have increasingly become more complex. For example, many electronic devices have one or more processors that help control the device, as well as a number of digital circuits to support the processor and other parts of the device. An electronic device may include multiple integrated circuits which require board level interconnects for communication and operational coordination. However, the presence of multiple interconnects causes board level congestion. Accordingly, what is needed is a scheme for improving the pin efficiency of interfaces that allows for an interconnect to be eliminated. Elimination of the interconnect reduces board level congestion as well as preserves pins and associated circuitry for other uses that would otherwise be required for the interconnect.

SUMMARY

Embodiments disclosed herein provide systems, methods and apparatus for signaling between devices.

In an aspect of the disclosure, a method of signaling between devices includes coupling a first device to a second device via a single bi-directional line, indicating initiation of a first action, initiated at the first device, by sending a first single transition on the single bi-directional line from the first device to the second device, and indicating initiation of a second action, initiated at the second device, by sending a second single transition on the single bi-directional line from the second device to the first device. The method further includes triggering, at the second device, a response to the first action upon receiving the first single transition sent from the first device, and triggering, at the first device, a response to the second action upon receiving the second single transition sent from the second device.

In an aspect of the disclosure, the first single transition is at least one of a rising edge or a falling edge, and the second single transition is at least one of the rising edge or the falling edge. In a further aspect of the disclosure, the first single transition sent by the first device is a rising edge and the second single transition sent by the second device is a falling edge.

In an aspect of the disclosure, one of the first device and the second device is a power management integrated circuit (PMIC) and the other of the first device and the second device is a system-on-chip (SoC). In another aspect of the disclosure, the first action is at least one of a reset action or a boot sequence handshake, and the second action is at least one of the reset action or the boot sequence handshake.

In an aspect of the disclosure, an apparatus for signaling between devices includes a first device, a second device, and a single bi-directional line coupling the first device to the second device. The first device indicates initiation of a first action, initiated at the first device, by sending a first single transition on the single bi-directional line to the second device, and the second device indicates initiation of a second action, initiated at the second device, by sending a second single transition on the single bi-directional line to the first device. Moreover, the second device triggers a response to the first action upon receiving the first single transition sent from the first device, and the first device triggers a response to the second action upon receiving the second single transition sent from the second device.

In an aspect of the disclosure, an apparatus for signaling between devices includes means for coupling a first device to a second device via a single bi-directional line, means for indicating initiation of a first action, initiated at the first device, by sending a first single transition on the single bi-directional line from the first device to the second device, means for indicating initiation of a second action, initiated at the second device, by sending a second single transition on the single bi-directional line from the second device to the first device, means for triggering, at the second device, a response to the first action upon receiving the first single transition sent from the first device, and means for triggering, at the first device, a response to the second action upon receiving the second single transition sent from the second device.

In an aspect of the disclosure, a processor-readable storage medium having one or more instructions which, when executed by a processing circuit, cause the processing circuit to couple a first device to a second device via a single bi-directional line, indicate initiation of a first action, initiated at the first device, by sending a first single transition on the single bi-directional line from the first device to the second device, indicate initiation of a second action, initiated at the second device, by sending a second single transition on the single bi-directional line from the second device to the first device, trigger, at the second device, a response to the first action upon receiving the first single transition sent from the first device, and trigger, at the first device, a response to the second action upon receiving the second single transition sent from the second device.

In an aspect of the disclosure, a method of signaling at a first device includes initiating a first action, indicating initiation of the first action by generating a first event on a single bi-directional line, and receiving an indication of a second action initiated at a second device by observing a second event on the single bi-directional line. The method further includes triggering a response to the second action upon receiving a first transition associated with the second event. In an aspect of the disclosure, the triggered response is variable depending on a state of a system that includes the first device and the second device.

In an aspect of the disclosure, the first event includes a first number of pulses, and the second event includes a second number of pulses different from the first number. In another aspect of the disclosure, the first event includes a single pulse and the second event includes a double pulse, or the first event includes the double pulse and the second event includes the single pulse. In a further aspect of the disclosure, the first event is differentiated from the second event by at least one of a voltage level, an impedance level, a pulse width, or a number of pulses.

In an aspect of the disclosure, one of the first device and the second device is a power management integrated circuit (PMIC) and the other of the first device and the second device is a system-on-chip (SoC). In another aspect of the disclosure, the first action is at least one of a reset action or a boot sequence handshake, and the second action is at least one of the reset action or the boot sequence handshake. In a further aspect of the disclosure, the first action and the second action are variable depending on a state of a system that includes the first device and the second device.

In an aspect of the disclosure, a first device includes a memory and a processing circuit coupled to the memory. The processing circuit is configured to initiate a first action, indicate initiation of the first action by generating a first event on a single bi-directional line, receive an indication of a second action initiated at a second device by observing a second event on the single bi-directional line, and trigger a response to the second action upon receiving a first transition associated with the second event.

In an aspect of the disclosure, a first device includes means for initiating a first action, means for indicating initiation of the first action by generating a first event on a single bi-directional line, means for receiving an indication of a second action initiated at a second device by observing a second event on the single bi-directional line, and means for triggering a response to the second action upon receiving a first transition associated with the second event.

In an aspect of the disclosure, a processor-readable storage medium having one or more instructions which, when executed by a processing circuit, cause the processing circuit to initiate a first action, indicate initiation of the first action by generating a first event on a single bi-directional line, receive an indication of a second action initiated at a second device by observing a second event on the single bi-directional line, and trigger a response to the second action upon receiving a first transition associated with the second event.

According to aspects of the disclosure, although the systems, methods and/or apparatus for signaling between devices using the single bi-directional signaling were described with respect to only two devices (e.g., first device and second device), the systems, methods, and/or apparatus may implement more than two devices. The manner in which such devices drive the single bi-directional line may be distinguished from each other. In an aspect of the disclosure, each device may be differentiated by generating a signal having a unique number of pulses, e.g., a third device triggers a reset/shutdown procedure or boot sequence handshake by generating three pulses on the single bi-directional line, a fourth device triggers a reset/shutdown procedure or boot sequence handshake by generating four pulses on the single bi-directional line, and so forth. In other aspects of the disclosure, each device may be differentiated by generating a signal having a unique pulse width, a unique voltage level, or a unique impedance level, etc.

DETAILED DESCRIPTION

Various aspects of the disclosure are now described with reference to the drawings. In the following description, for purposes of explanation, numerous specific details are set forth in order to provide a thorough understanding of one or more aspects. It may be evident, however, that such aspect(s) may be practiced without these specific details.

Overview

Aspects of the present disclosure relate to a low-level control interface between a power management integrated circuit (PMIC) and an associated host-processor (e.g., system-on-chip (SoC)). In an aspect of the disclosure, the low-level control interface between the PMIC and the SoC typically involves signaling at a very early stage of system boot, or at a later time when dependency on a bus-based control scheme does not guarantee robust system behavior. Examples of such signaling include, but are not limited to, a power-on/reset signal (PON_RESET_N), a watch dog timer input signal (WDT_IN), and a power supply hold signal (PS_HOLD). The low-level control interface may farther involve other types of control signals as newer generation systems may have additional low-level signaling requirements.

In an aspect of the disclosure, the low-level control interface may require one pin for each type of signal communicated. As such, a dedicated control pin must be added to the interface to support each additional type of information to be communicated. However, this approach is problematic as the addition of the dedicated control pins adds to package level cost, and further, may be impermissible due to package-size and cost constraints. The present disclosure addresses the problems of the multi-pin approach by using a single bi-directional line to facilitate communication of low-level control functions.

Exemplary Operating Environment

Certain disclosed examples relate to systems and apparatus for signaling between devices over a single bi-directional line.

Figure 1:
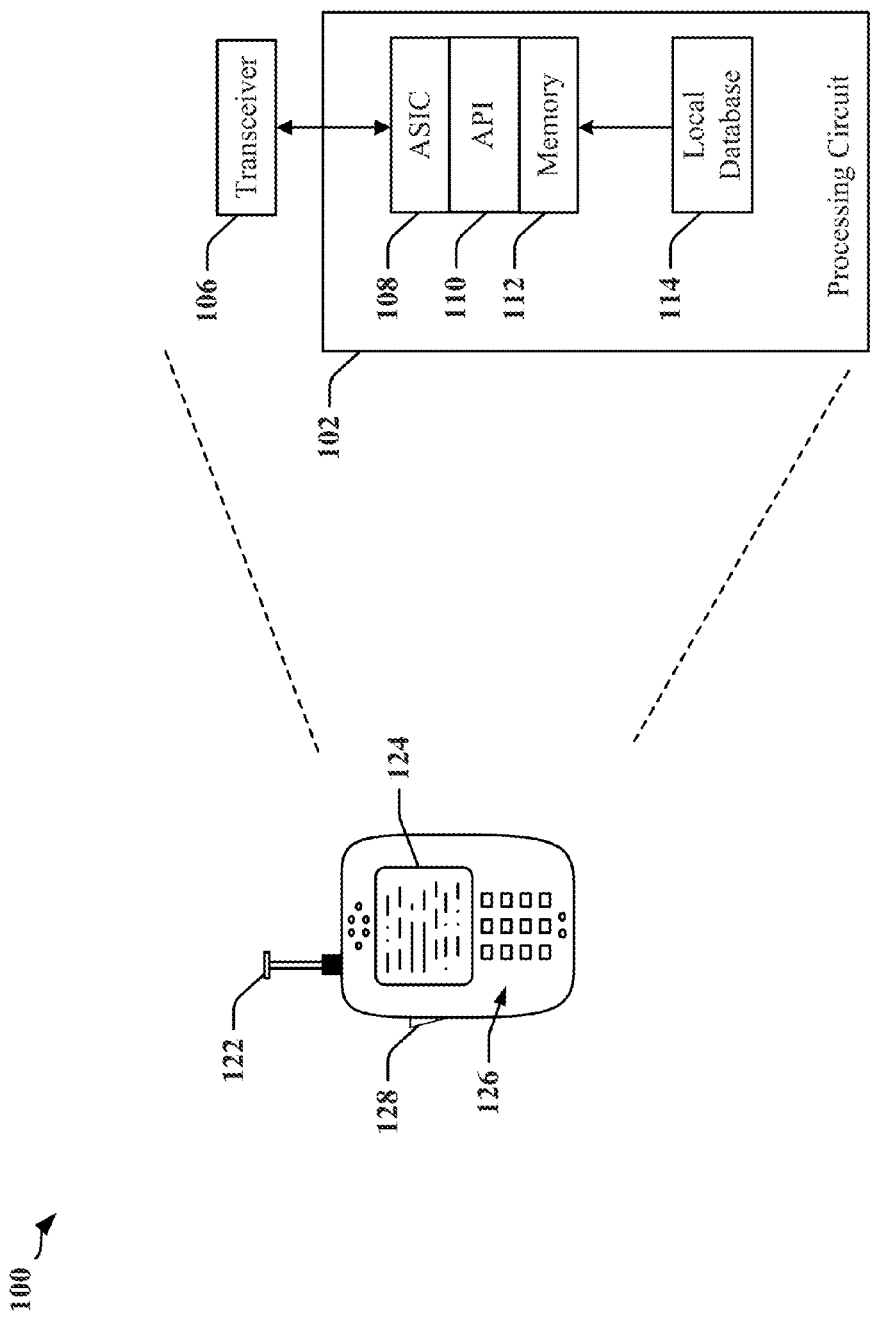
FIG. 1 depicts an apparatus for signaling between devices over a single bi-directional line.

Certain aspects of the disclosure may be applicable to communications links deployed between electronic components, which may include subcomponents of devices such as telephones, mobile computing devices, appliances, automobile electronics, avionics systems, etc. Referring to FIG. 1, for example, an apparatus 100 for signaling between devices over a single bi-directional line may include a processing circuit 102 that is configured to control operation of the apparatus 100. The processing circuit 102 may access and execute software applications and control logic circuits and other devices within the apparatus 100. In one example, the apparatus 100 may include a wireless communication device that communicates through a radio frequency (RF) communications transceiver 106 with a radio access network (RAN), a core access network, the Internet and/or another network. The communications transceiver 106 may be operably coupled to a processing circuit 102. The processing circuit 102 may include one or more IC devices, such as an application specific integrated circuit (ASIC) 108. The ASIC 108 may include one or more processing devices, logic circuits, and so on. The processing circuit 102 may include and/or be coupled to processor readable storage 112 that may maintain instructions and data that may be executed by the processing circuit 102. The processing circuit 102 may be controlled by one or more of an operating system and an application programming interface (API) 110 layer that supports and enables execution of software modules residing in the storage 112 of the wireless device. The storage 112 may include read only memory (ROM) or random access memory (RAM), electrically erasable programmable read only memory (EEPROM), a flash memory device, or any memory device that can be used in processing systems and computing platforms. The processing circuit 102 may include and/or access a local database 114 that can maintain operational parameters and other information used to configure and operate the apparatus 100. The local database 114 may be implemented using one or more of a database module or server, flash memory, magnetic media, EEPROM, optical media, tape, soft or hard disk, or the like. The processing circuit may also be operably coupled to external devices such as an antenna 122, a display 124, operator controls, such as a button 128 and a keypad 126, among other components.

Figure 2:
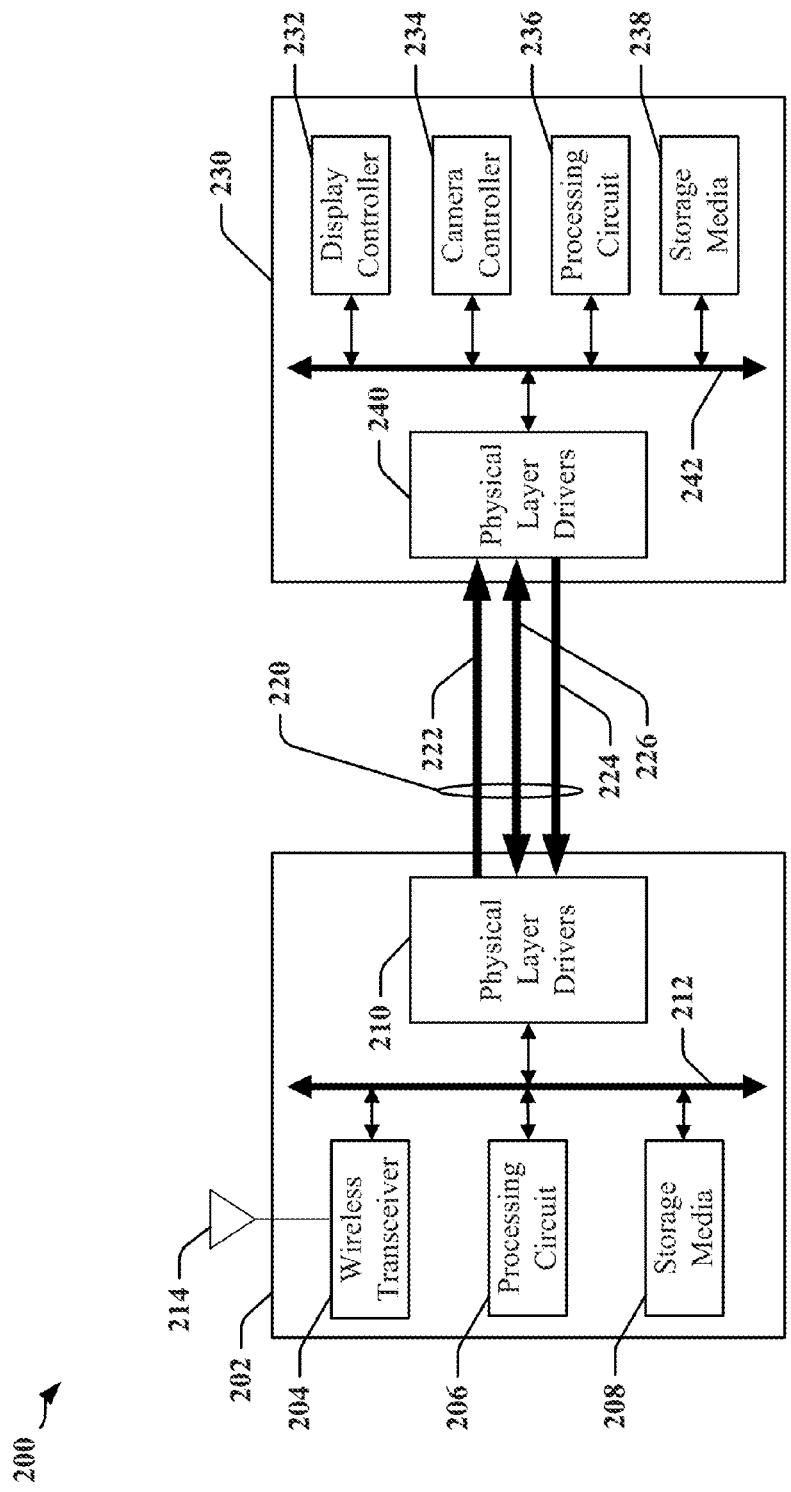
FIG. 2 illustrates a system architecture for an apparatus that facilitates signaling between devices over a single bi-directional line.

FIG. 2 is a block schematic illustrating certain aspects of an apparatus 200 such as a wireless mobile device, a mobile telephone, a mobile computing system, a wireless telephone, a notebook computer, a tablet computing device, a media player, a gaming device, or the like. The apparatus 200 may include a plurality of IC devices 202 and 230 that exchange data and control information through a communications link 220. The communications link 220 may be used to connect the IC devices 202 and 230, which may be located in close proximity to one another or physically located in different parts of the apparatus 200. In one example, the communications link 220 may be provided on a chip carrier, substrate or circuit board that carries the IC devices 202 and 230. In another example, a first IC device 202 may be located in a keypad section of a flip-phone while a second IC device 230 may be located in a display section of the flip-phone. A portion of the communications link 220 may include a cable or an optical connection.

The communications link 220 may include multiple channels 222, 774 and 226. One or more channel 226 may be bidirectional, and may operate in half-duplex mode and/or full-duplex mode. One or more channels 222, 224 may be unidirectional. The communications link 220 may be asymmetrical, providing higher bandwidth in one direction. In one example described herein, a first communications channel 222 may be referred to as a forward link 222 while a second communications channel 224 may be referred to as a reverse link 224. The first IC device 202 may be designated as a host, master and/or transmitter, while the second IC device 230 may be designated as a client, slave and/or receiver, even if both IC devices 202 and 230 are configured to transmit and receive on the communications link 220. In one example, the forward link 222 may operate at a higher data rate when communicating data from a first IC device 202 to a second IC device 230, while the reverse link 224 may operate at a lower data rate when communicating data from the second IC device 230 to the first IC device 202.

The IC devices 202 and 230 may each include a processor or other processing and/or computing circuit or device 206, 236. In one example, the first IC device 202 may perform core functions of the apparatus 200, including maintaining wireless communications through a wireless transceiver 204 and an antenna 214, while the second IC device 230 may support a user interface that manages or operates a display controller 232, and may control operations of a camera or video input device using a camera controller 234. Other features supported by one or more of the IC devices 202 and 230 may include a keyboard, a voice-recognition component, and other input or output devices. The display controller 232 may include circuits and software drivers that support a display such as a liquid crystal display (LCD) panel, a touch-screen display, an indicator, and so on. The storage media 208 and 238 may include transitory and/or non-transitory storage devices adapted to maintain instructions and data used by the respective processing circuits 206 and 236, and/or other components of the IC devices 202 and 230. Communication between each processing circuit 206, 236 and its corresponding storage media 208 and 238 and other modules and circuits may be facilitated by one or more buses 212 and 242, respectively.

The reverse link 224 may be operated in the same manner as the forward link 222. The forward link 222 and the reverse link 224 may be capable of transmitting at comparable speeds or at different speeds, where speed may be expressed as a data transfer rate and/or a clocking rate. The forward and reverse data rates may be substantially the same or may differ by orders of magnitude, depending on the application. In some applications a single bidirectional link 226 may support communications between the first IC device 202 and the second IC device 230. The forward link 222 and/or the reverse link 224 may be configurable to operate in a bidirectional mode when, for example, the forward and reverse links 222 and 224 share the same physical connections and operate in a half-duplex manner.

In certain examples, the reverse link 224 derives a clocking signal from the forward link 222 for synchronization purposes, for control purposes, to facilitate power management and/or for simplicity of design. The clocking signal may have a frequency that is obtained by dividing the frequency of a symbol clock used to transmit signals on the forward link 222. The symbol clock may be superimposed or otherwise encoded in symbols transmitted on the forward link 222. The use of a clocking signal that is a derivative of the symbol clock allows fast synchronization of transmitters and receivers (transceivers 210, 240) and enables fast start and stop of data signals without the need for framing to enable training and synchronization.

In certain examples, a single bidirectional link 226 may support communications between the first IC device 202 and the second IC device 230. In some instances, the first IC device 202 and the second IC device 230 provide encoding and decoding of data, address and control signals transmitted between a processing device and memory devices such as dynamic random access memory (DRAM).

Exemplary Description of Signaling Between Devices

Figure 3:
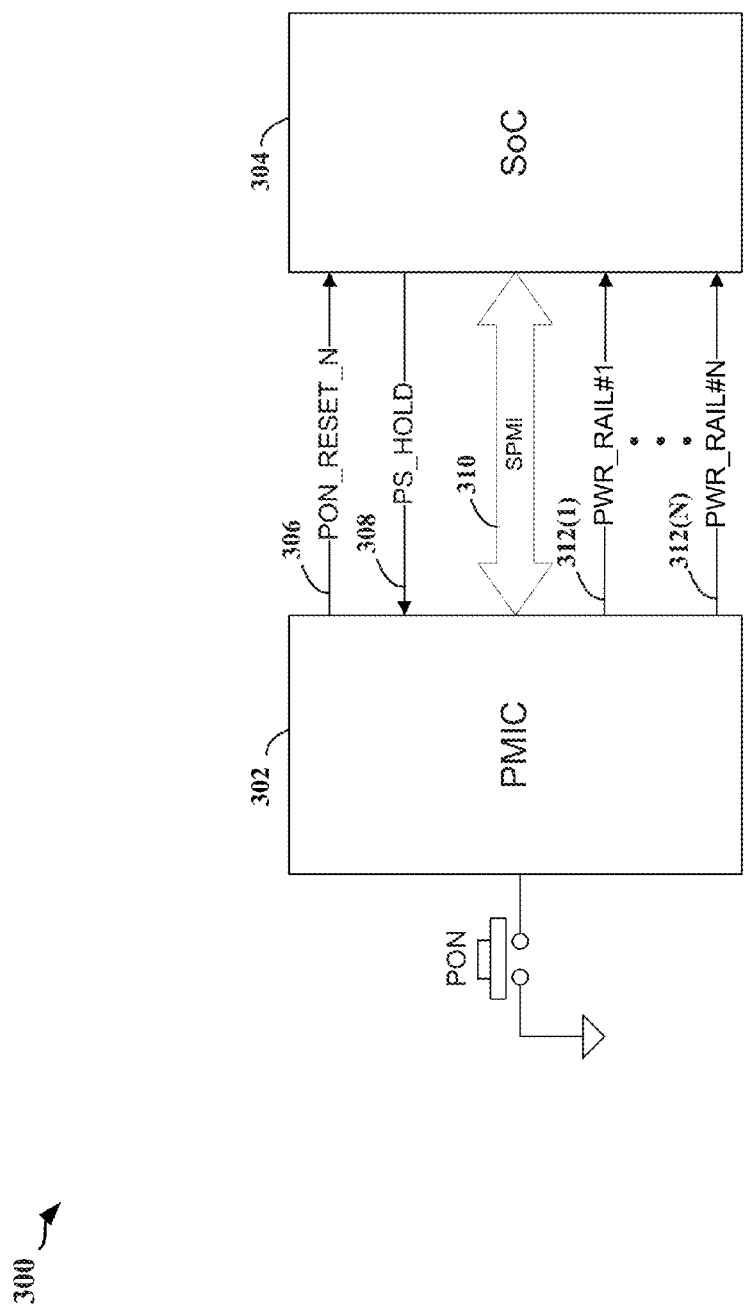
FIG. 3 is a diagram illustrating a low-level interface between a PMIC and a SoC.

FIG. 3 is a diagram 300 illustrating a low-level interface between a PMIC 302 and a SoC 304. Pin count reduction is a chipset goal to drive cost, area, and routing optimizations. As shown in FIG. 3, a low-level PMIC-to-SoC interface for boot, reset, and shutdown coordination may be implemented with two pins (two wire interfaces) on each integrated circuit (IC). In particular, the low-level PMIC-to-SoC interface may involve two signals: 1) PON_RESET_N communicated on wire 306; and 2) PS_HOLD communicated on wire 308. Both the PMIC 302 and the SoC 304 use two pins (e.g., dual-pin or dual-wire interface scheme) for communicating the two signals. As further shown in FIG. 3, the PMIC 302 and the SoC 304 may share a system power management interface (SPMI) 310, as well as a number of power rails, e.g., a first power rail (PWR_RAIL#1) 312(1) to a N-th power rail (PWR_RAIL#N) 312(N).

In an aspect of the disclosure, access to PON_RESET_N and PS_HOLD is crucial for system level verifications and debug of any issues related to power-up/power-down and reset functions. The dual-pin scheme may be used for validating power-up timing and identifying source(s) of reset and power-down functions. The dual-pin scheme also provides timing association with potential triggers. However, the dual-pin scheme is problematic as the number of pins required by the interface adds to package level cost. Moreover, the interface may not be permitted to support such a number of pins due to package-size and cost constraints. Accordingly, the present disclosure resolves the problems of the dual-pin scheme by functionally consolidating control functions (e.g., PON_RESET_N and PS_HOLD) into a single wire interface. This saves at least two chipset pins and at least one route between the PMIC and the SoC.

Figure 4:
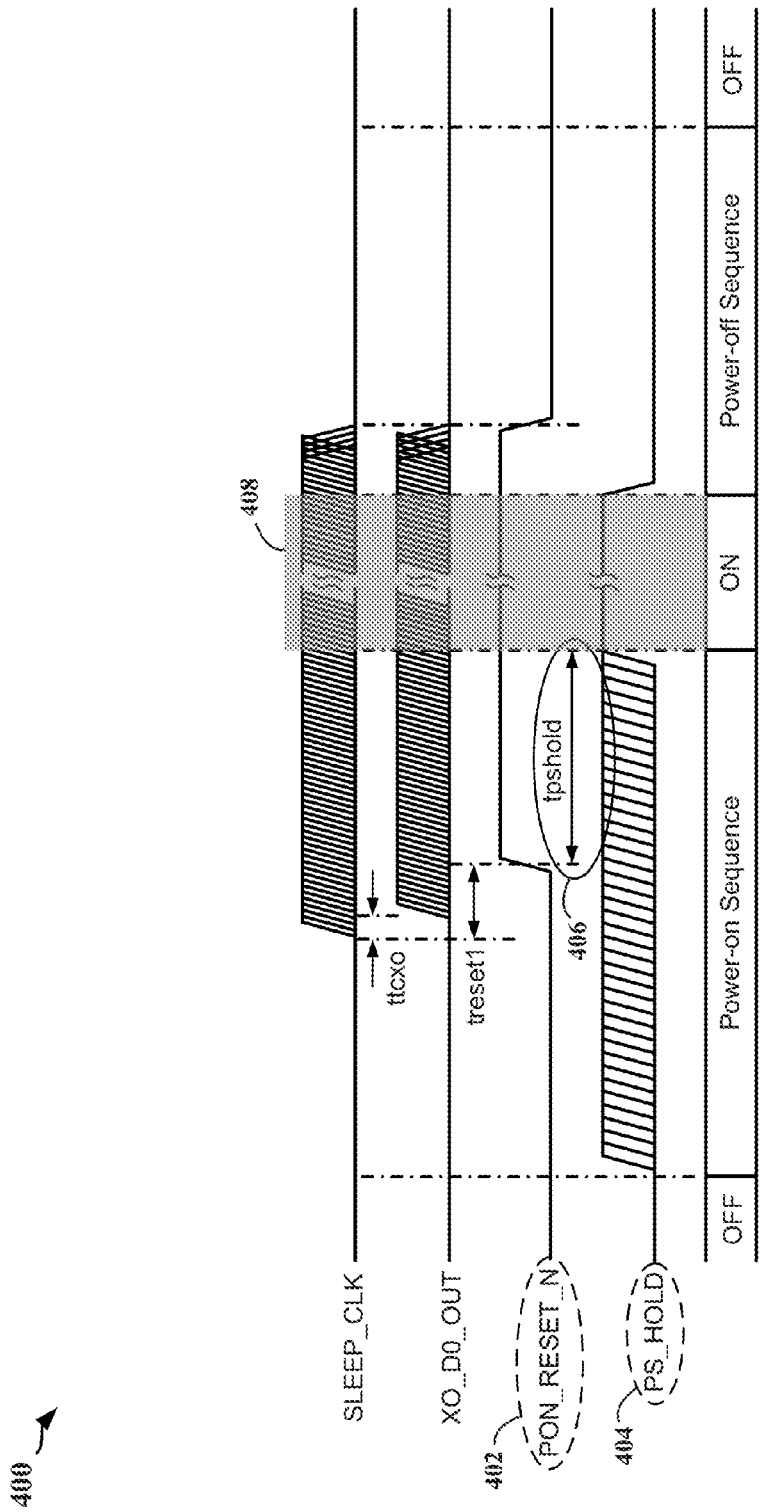
FIG. 4 is a diagram illustrating a timing behavior of low-level control signals.

FIG. 4 is a diagram 400 illustrating a timing behavior of low-level control signals. A timing behavior of PON_RESET_N is shown at 402. A timing behavior of PS_HOLD is shown at 404. As shown at 406, an appreciable gap (approximately 56 µs) exists between de-assertion of PON_RESET_N and assertion of PS_HOLD. According to aspects of the disclosure, the timing of the two signals (PON_RESET_N and PS_HOLD), as well as their operational behavior, are maintained.

In an aspect of the disclosure, the PON_RESET_N line 402 and the PS_HOLD line 404 are combined. A shaded region 408 shows the steady state behavior of the two signals when a system is working properly. Within the region 408, the PON_RST_N line 402 goes low if, for example, a user initiates a system reset by pressing a system reset button. The PS_HOLD line 404 goes low if, for example, a system software starts a soft reset or system power cycle, or if a watch dog timer (WDT) overflow event is encountered.

Figure 5:
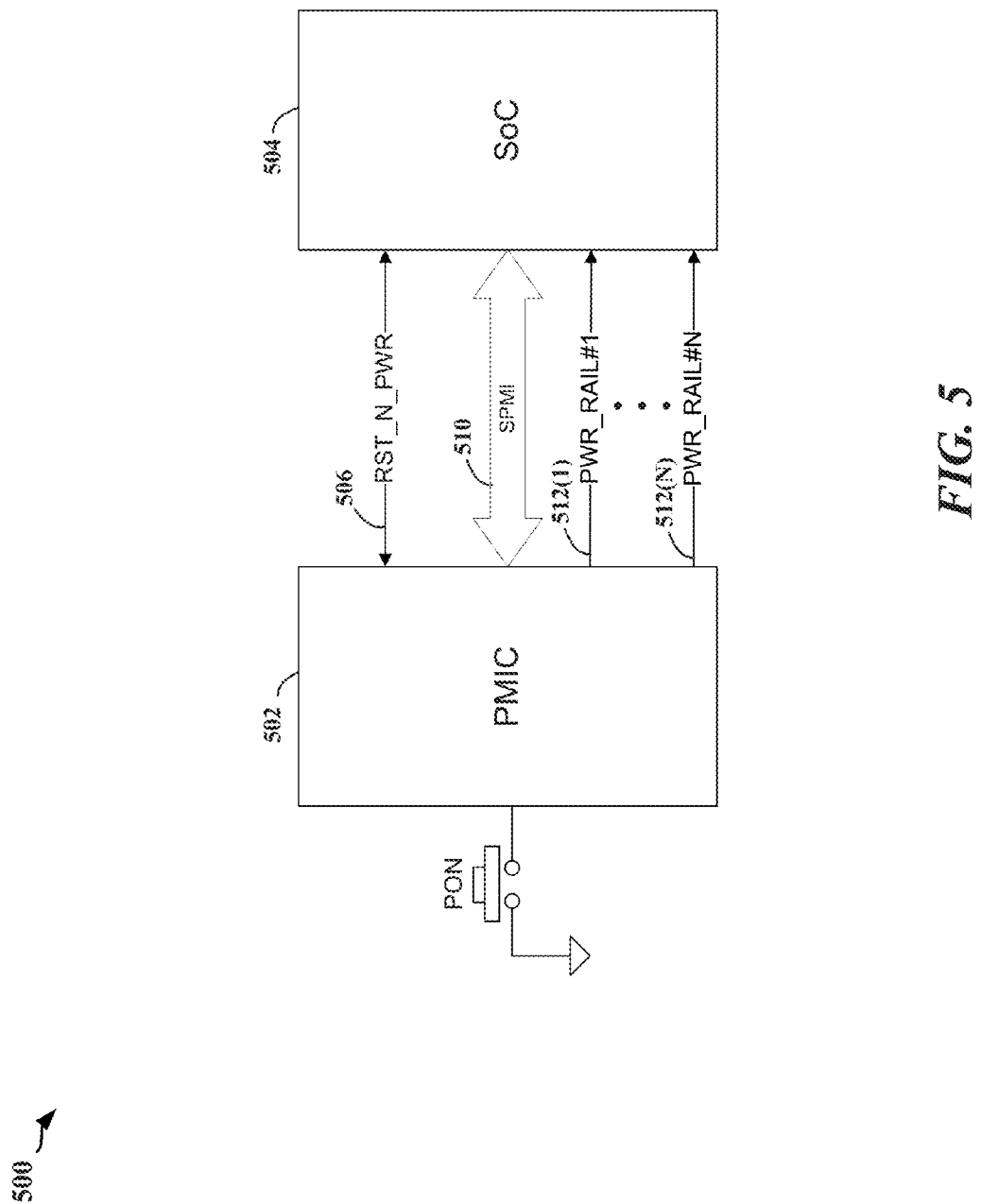
FIG. 5 is diagram illustrating a novel low-level interface between a PMIC and a SoC.

FIG. 5 is diagram 500 illustrating a novel low-level interface between a PMIC 502 and a SoC 504. As shown in FIG. 5, the novel architecture uses a bi-directional signaling approach over a single wire. In particular, a single control signal (e.g., RST_N_PWR) may be communicated from the PMIC 502 to the SoC 504, or from the SoC 504 to the PMIC 502 over a single bi-directional line 506. In an aspect of the disclosure, RST_N_PWR is a consolidation/combination of PON_RESET_N and PS_HOLD of FIG. 3. As further shown in FIG. 5, the PMIC 502 and the SoC 504 may share a system power management interface (SPMI) 510, as well as a number of power rails, e.g., a first power rail (PWR_RAIL#1) 512(1) to a N-th power rail (PWR_RAIL#N) 512(N).

Communication of RST_N_PWR allows for the provision of output impedance, poll rap (PU) control, pull-down (PD) control, necessary logic, and timing control elements to enable unhindered operation of the system by maintaining all real-time timing requirements of the low level control signals. The novel architecture saves one pin on each IC and eliminates a top level trace between the PMIC 502 and the SoC 504. The novel architecture preserves the same system level behavior and visibility as with the dual-pin interface scheme. The novel architecture further supports simple standalone test bench booting without need for complex signaling.

Figure 6:
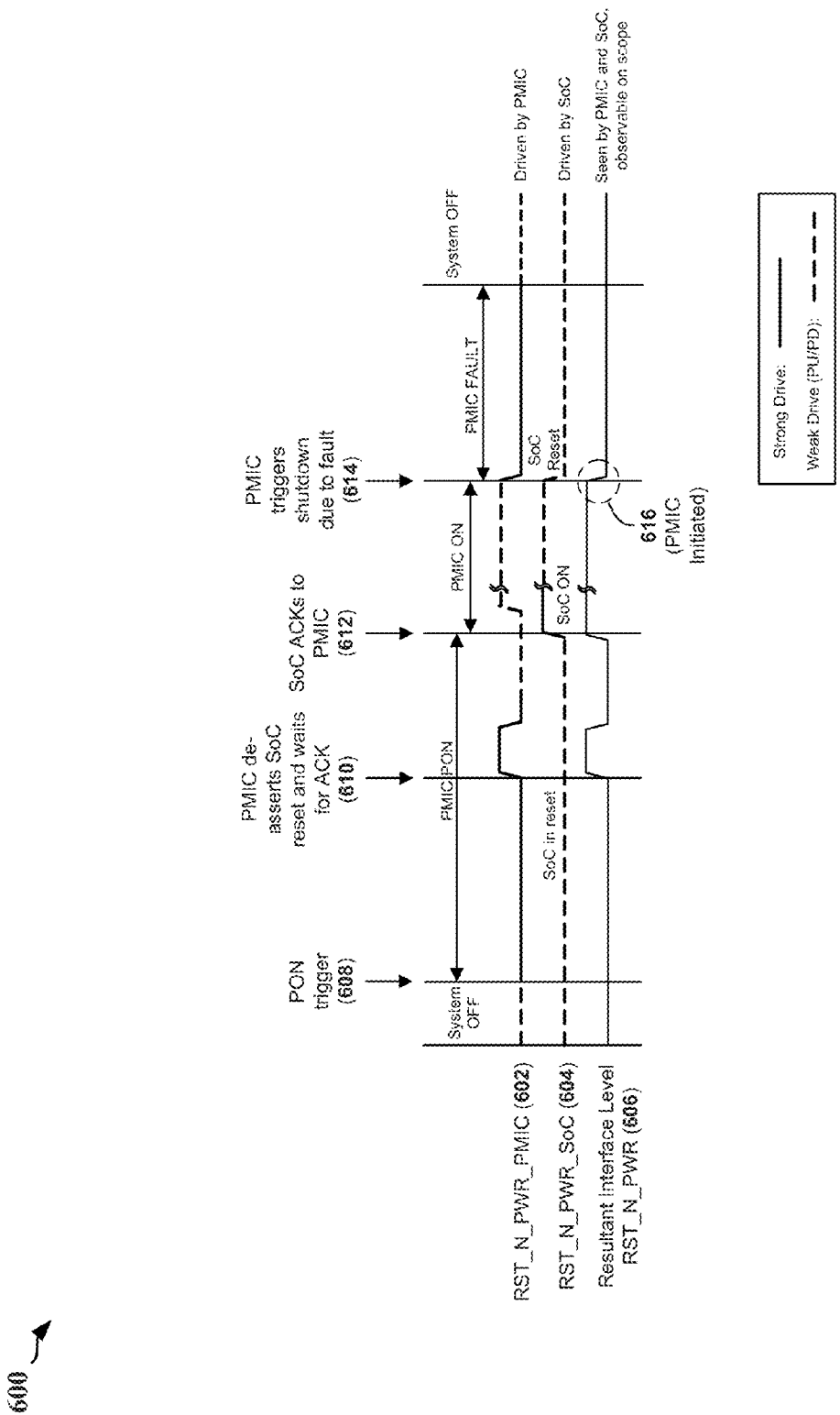
FIG. 6 is a diagram illustrating device behavior during a PMIC-initiated reset/shutdown procedure when implementing bi-directional signaling over a single wire.

FIG. 6 is a diagram 600 illustrating device behavior during a PMIC-initiated reset/shutdown procedure when implementing bi-directional signaling over a single wire. The manner in which the PMIC drives the single wire (e.g., bi-directional line 506 of FIG. 5 to communicate RST_N_PWR is shown at 602. The manner in which the SoC drives the single wire to communicate RST_N_PWR is shown at 604. A resultant interface level of the single wire as a result of being driven by the PMIC and/or the SoC is shown at 606. The resultant interface level 606 may be observed by the PMIC and the SoC, and verifiable via oscilloscope.

As shown in FIG. 6, while the system is off, a power-on trigger (PON trigger) may occur at 608 prompting the PMIC to power on. During this time, the SoC may be in a reset mode. At 610, the PMIC de-asserts the SoC reset by generating, for example, a pulse having a rising edge and a failing edge on the single wire. After generating the pulse, the PMIC waits for an acknowledgement (ACK) from the SoC. At 612, the SoC sends the ACK to the PMIC by generating, for example, a pulse with a rising edge on the single wire. The SoC subsequently powers on after sending the ACK.

At 614, the PMIC may observe a fault condition (or watchdog event). Accordingly, the PMIC triggers a reset/shutdown due to the fault condition by generating, for example, a single pulse on the single bi-directional line. The SoC observes the single pulse and responds by transitioning to a reset mode.

In an aspect of the disclosure, triggering the reset/shutdown by generating the single pulse on the single bi-directional line is unique to the PMIC. Hence, the reset/shutdown procedure initiated by the PMIC may be distinguished by observing the single pulse at 616. In an aspect of the disclosure, the single pulse includes a single transition on the single bi-directional line. The single transition may be a rising edge or a falling edge. The response from the SoC may be triggered upon observing the single transition, whether it be a rising edge or a falling edge.

In an aspect of the disclosure, procedures other than the reset/shutdown procedure may be triggered by the PMIC at 614. For example, the PMIC may trigger a boot sequence handshake at 614 by generating the single pulse on the single bi-directional line.

Figure 7:
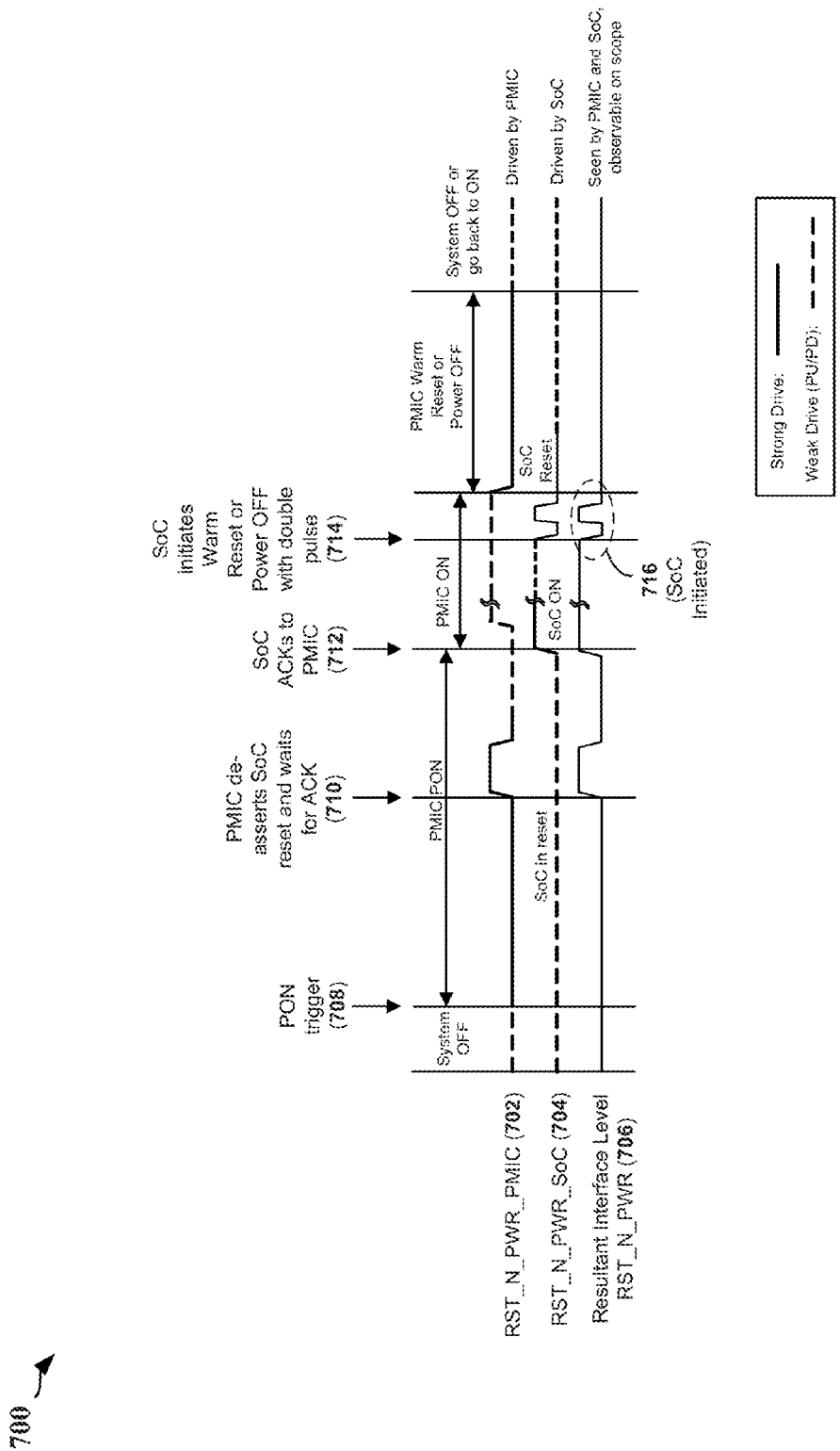
FIG. 7 is a diagram illustrating device behavior during a SoC-initiated reset/shutdown procedure when implementing bi-directional signaling over a single wire.

FIG. 7 is a diagram 700 illustrating device behavior during a SoC-initiated reset/shutdown procedure when implementing bi-directional signaling over a single wire. The manner in which the PMIC drives the single wire (e.g., bi-directional line 506 of FIG. 5) to communicate RST_N_PWR is shown at 702. The manner in which the SoC drives the single wire to communicate RST_N_PWR is shown at 704. A resultant interface level of the single wire as a result of being driven by the PMIC and/or the SoC is shown at 706. The resultant interface level 706 may be observed by the PMIC and the SoC, and verifiable via oscilloscope.

As shown in FIG. 7, while the system is off, a power-on trigger (PON trigger) may occur at 708 prompting the PMIC to power on. During this time, the SoC may be in a reset mode. At 710, the PMIC de-asserts the SoC reset by generating, for example, a pulse having a rising edge and a falling edge on the single wire. After generating the pulse, the PMIC waits for an acknowledgement (ACK) from the SoC. At 712, the SoC sends the ACK to the PMIC by generating, for example, a pulse with a rising edge on the single wire. The SoC subsequently powers on after sending the ACK.

At 714, the SoC may initiate a reset/shutdown (warm reset or power off) due to, for example, the observance of a watchdog event. The SoC triggers the reset/shutdown by generating, for example, a double pulse on the single bi-directional line. The PMIC observes the double pulse and responds by transitioning to a warm reset or power off mode.

In an aspect of the disclosure, triggering the reset/shutdown by generating the double pulse on the single bi-directional line is unique to the SoC. Hence, the reset/shutdown procedure initiated by the SoC may be distinguished by observing the double pulse at 716. In an aspect of the disclosure, the double pulse may include a number of transitions on the single bi-directional line including a rising edge and/or a failing edge. The response from the SoC may be triggered upon observing a first transition of the double pulse, whether it be a rising edge or a falling edge.

In an aspect of the disclosure, procedures other than the reset/shutdown procedure may be triggered by the SoC at 714. For example, the SoC may trigger a boot sequence handshake at 714 by generating the double pulse on the single bi-directional line.

Referring to FIGS. 6 and 7, the novel architecture using bi-directional signaling over a single wire allows for easy oscilloscope verification of which IC (PMIC or SoC) drives the single bi-directional line. This facilitates debugging to gather the same insight as with a dual-pin interface. In an aspect of the disclosure, the PMIC's active drive low has to delay long enough for the double pulse to be seen to differentiate PMIC initiation from SoC initiation. In a further aspect of the disclosure, the novel scheme preserves the ability for simple standalone PMIC booting by strapping RST_N_PWR to a 1.8V IO rail through a high valued resistor (which can be overcome by the PMIC's pulldown at PON completion).

In an aspect of the disclosure, although the novel architecture using bi-directional signaling over a single wire was described with respect to only two devices (PMIC and SoC), the novel architecture may be implemented by more than two devices, including non-PMIC and non-SoC devices. The manner in which such devices drive the single bi-directional line are to be distinguished from each other. For example, each device may be differentiated by generating a signal having a unique number of pulses, e.g., a third device triggers a reset/shutdown procedure or boot sequence handshake by generating three pulses on the single bi-directional line, a fourth device triggers a reset/shutdown procedure or boot sequence handshake by generating four pulses on the single bi-directional line, and so forth. In other examples, each device may be differentiated by generating a signal having a unique pulse width, a unique voltage level, or a unique impedance level, etc.

Exemplary Device and Methods for Communicating over Single Bi-Directional Line

Figure 8:
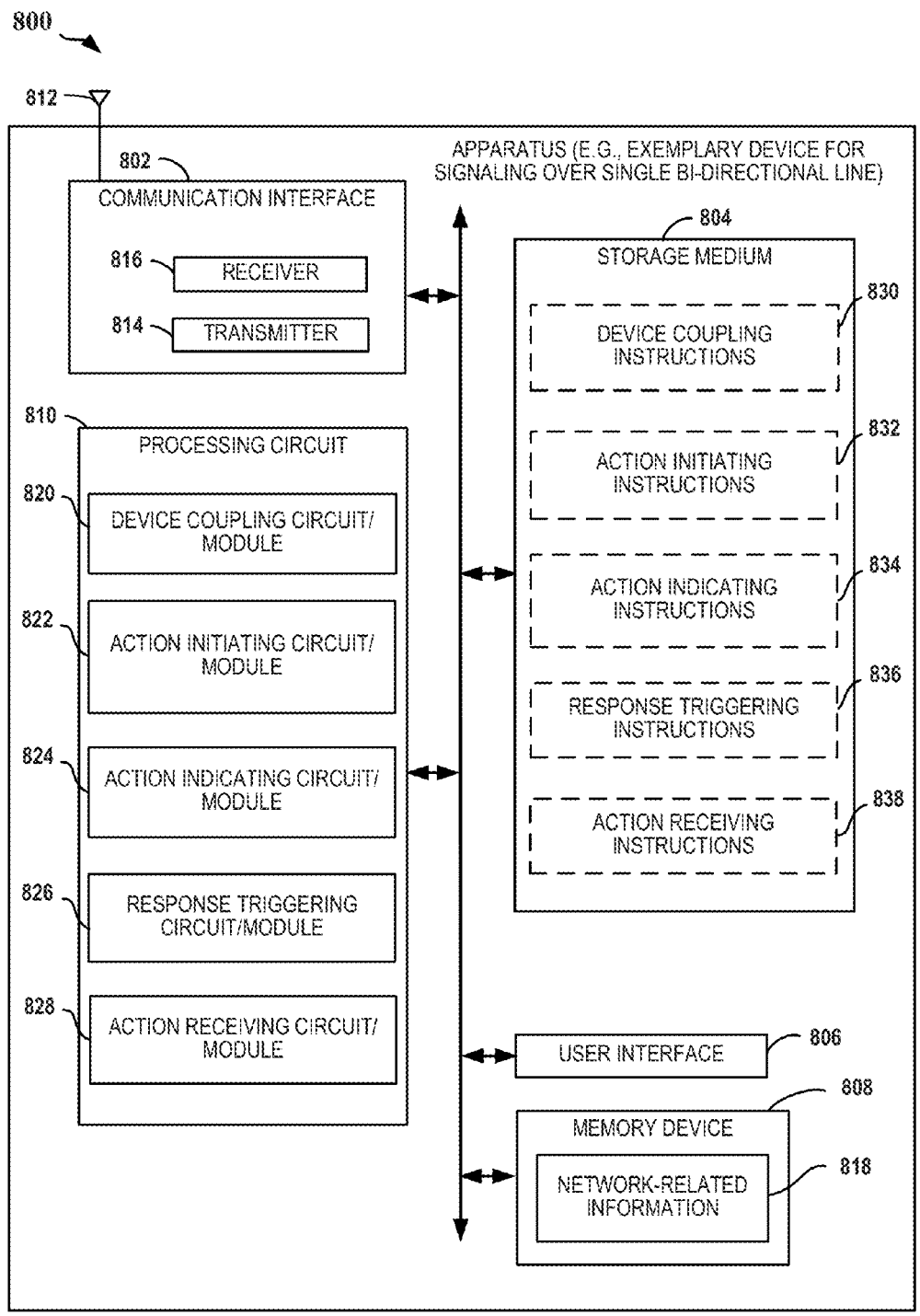
FIG. 8 is an illustration of an apparatus configured to support operations related to signaling between devices over a single bi-directional line according to one or more aspects of the disclosure.

FIG. 8 is an illustration of an apparatus 800 configured to support operations related to signaling between devices over a single bi-directional line according to one or more aspects of the disclosure (e.g., aspects related to the methods of FIGS. 9 and 10 described below). The apparatus 800 includes a communication interface (e.g., at least one transceiver) 802, a storage medium 804, a user interface 806, a memory device 808, and a processing circuit 810.

These components can be coupled to and/or placed in electrical communication with one another via a signaling bus or other suitable component, represented generally by the connection lines in FIG. 8. The signaling bus may include any number of interconnecting buses and bridges depending on the specific application of the processing circuit 810 and the overall design constraints. The signaling bus links together various circuits such that each of the communication interface 802, the storage medium 804, the user interface 806, and the memory device 808 are coupled to and/or in electrical communication with the processing circuit 810. The signaling bus may also link various other circuits (not shown) such as timing sources, peripherals, voltage regulators, and power management circuits, which are well known in the art, and therefore, will not be described any further.

The communication interface 802 may be adapted to facilitate wireless communication of the apparatus 800. For example, the communication interface 802 may include circuitry and/or code (e.g., instructions) adapted to facilitate the communication of information bi-directionally with respect to one or more communication devices in a network. The communication interface 802 may be coupled to one or more antennas 812 for wireless communication within a wireless communication system. The communication interface 802 can be configured with one or more standalone receivers and/or transmitters, as well as one or more transceivers. In the illustrated example, the communication interface 802 includes a transmitter 814 and a receiver 816.

The memory device 808 may represent one or more memory devices. As indicated, the memory device 808 may maintain network-related information 818 along with other information used by the apparatus 800, in some implementations, the memory device 808 and the storage medium 804 are implemented as a common memory component. The memory device 808 may also be used for storing data that is manipulated by the processing circuit 810 or some other component of the apparatus 800.

The storage medium 804 may represent one or more computer-readable, machine-readable, and/or processor-readable devices for storing code, such as processor executable code or instructions (e.g., software, firmware), electronic data, databases, or other digital information. The storage medium 804 may also be used for storing data that is manipulated by the processing circuit 810 when executing code. The storage medium 804 may be any available media that can be accessed by a general purpose or special purpose processor, including portable or fixed storage devices, optical storage devices, and various other mediums capable of storing, containing or carrying code.

By way of example and not limitation, the storage medium 804 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing code that may be accessed and read by a computer. The storage medium 804 may be embodied in an article of manufacture (e.g., a computer program product). By way of example, a computer program product may include a computer-readable medium in packaging materials. In view of the above, in some implementations, the storage medium 804 may be a non-transitory (e.g., tangible) storage medium.

The storage medium 804 may be coupled to the processing circuit 810 such that the processing circuit 810 can read information from, and write information to, the storage medium 804. That is, the storage medium 804 can be coupled to the processing circuit 810 so that the storage medium 804 is at least accessible by the processing circuit 810, including examples where at least one storage medium is integral to the processing circuit 810 and/or examples where at least one storage medium is separate from the processing circuit 810 (e.g., resident in the apparatus 800, external to the apparatus 800, distributed across multiple entities, etc.).

Code and/or instructions stored by the storage medium 804, when executed by the processing circuit 810, causes the processing circuit 810 to perform one or more of the various functions and/or process operations described herein. For example, the storage medium 804 may include operations configured for regulating operations at one or more hardware blocks of the processing circuit 810, as well as to utilize the communication interface 802 for wireless communication utilizing their respective communication protocols.

The processing circuit 810 is generally adapted for processing, including the execution of such code/instructions stored on the storage medium 804. As used herein, the term "code" or "instructions" shall be construed broadly to include without limitation programming, instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 810 is arranged to obtain, process and/or send data, control data access and storage, issue commands, and control other desired operations. The processing circuit 810 may include circuitry configured to implement desired code provided by appropriate media in at least one example. For example, the processing circuit 810 may be implemented as one or more processors, one or more controllers, and/or other structure configured to execute executable code. Examples of the processing circuit 810 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 810 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 810 are for illustration and other suitable configurations within the scope of the disclosure are also contemplated.

According to one or more aspects of the disclosure, the processing circuit 810 may be adapted to perform any or all of the features, processes, functions, operations and/or routines for any or all of the apparatuses described herein. As used herein, the term "adapted" in relation to the processing circuit 810 may refer to the processing circuit 810 being one or more of configured, employed, implemented, and/or programmed to perform a particular process, function, operation and/or routine according to various features described herein.

Figure 9:
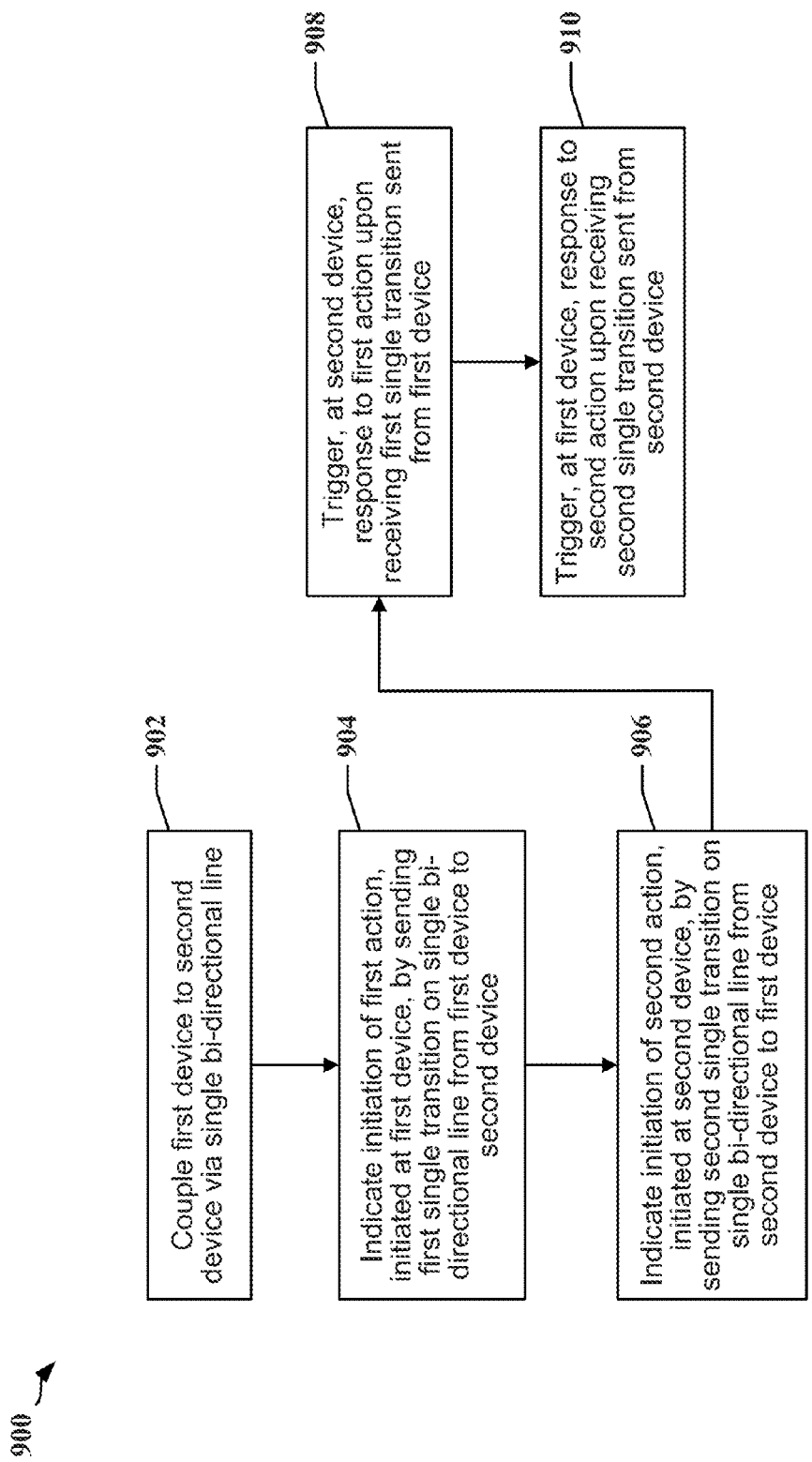
FIG. 9 is a flowchart illustrating a method of signaling between devices over a single bi-directional line according to an aspect of the disclosure.
Figure 10:
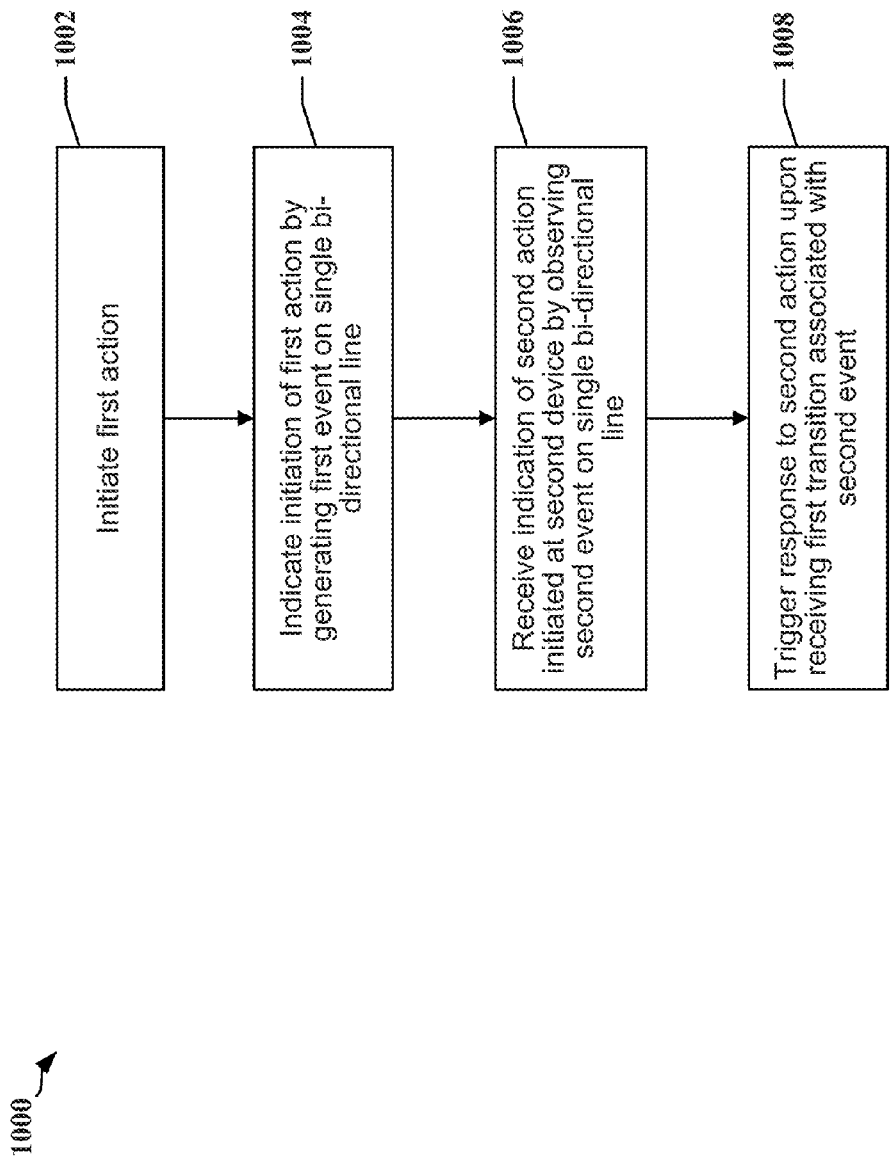
FIG. 10 is a flowchart illustrating a method of signaling at a first device over a single bi-directional line according to another aspect of the disclosure.

According to at least one example of the apparatus 800, the processing circuit 810 may include one or more of a device coupling circuit/module 820, an action initiating circuit/module 822, an action indicating circuit/module 824, a response triggering circuit/module 826, and an action receiving circuit/module 828, that are adapted to perform any or all of the features, processes, functions, operations and/or routines described herein (e.g., features, processes, functions, operations and/or routines described with respect to FIG. 9 and/or FIG. 10).

The device coupling circuit/module 820 may include circuitry and/or instructions (e.g., device coupling instructions 830 stored on the storage medium 804) adapted to perform several functions relating to, for example, coupling a first device to a second device via a single bi-directional line.

The action initiating circuit/module 822 may include circuitry and/or instructions (e.g., action initiating instructions 832 stored on the storage medium 804) adapted to perform several functions relating to, for example, initiating a first action at the first device and/or initiating a second action at the second device.

The action indicating circuit/module 824 may include circuitry and/or instructions (e.g., action indicating instructions 834 stored on the storage medium 804) adapted to perform several functions relating to, for example, indicating initiation of a first action, initiated at the first device, by sending a first single transition on the single bi-directional line from the first device to the second device and indicating initiation of a second action, initiated at the second device, by sending a second single transition on the single bi-directional line from the second device to the first device. In another aspect of the disclosure, the action indicating circuit/module 824 may be adapted to perform several functions relating to, for example, indicating initiation of the first action by generating a first event on a single bi-directional line.

The response triggering circuit/module 826 may include circuitry and/or instructions (e.g., response triggering instructions 836 stored on the storage medium 804) adapted to perform several functions relating to, for example, triggering, at the second device, a response to the first action upon receiving the first single transition sent from the first device and triggering, at the first device, a response to the second action upon receiving the second single transition sent from the second device. Accordingly, the action receiving circuit/module 828 may include circuitry and/or instructions (e.g., action receiving instructions 838 stored on the storage medium 804) adapted to perform several functions relating to, for example, receiving the first single transition sent from the first device and receiving the second single transition sent from the second device.

The action receiving circuit/module 828 may further include circuitry and/or instructions (e.g., action receiving instructions 838 stored on the storage medium 804) adapted to perform several functions relating to, for example, receiving an indication of a second action initiated at a second device by observing a second event on the single bi-directional line. Accordingly, the response triggering circuit/module 826 may further be adapted to perform several functions relating to, for example, triggering a response to the second action upon receiving a first transition associated with the second event.

As mentioned above, instructions stored by the storage medium 804, when executed by the processing circuit 810, causes the processing circuit 810 to perform one or more of the various functions and/or process operations described herein. For example, the storage medium 804 may include one or more of the device coupling instructions 830, the action initiating instructions 832, the action indicating instructions 834, the response triggering instructions 836, and the action receiving instructions 838.

FIG. 9 is a flowchart 900 illustrating a method of signaling between devices over a single bi-directional line. The method may be performed by an apparatus (e.g., apparatus 100 of FIG. 1, devices 502 and 504 of FIG. 5, or apparatus 800 of FIG. 8).

The apparatus couples a first device to a second device via a single bi-directional line 902. In an aspect of the disclosure, one of the first device and the second device is a power management integrated circuit (PMIC) and the other of the first device and the second device is a system-on-chip (SoC).

The apparatus indicating initiation of a first action, initiated at the first device, by sending a first single transition on the single bi-directional line from the first device to the second device 904. The apparatus indicates initiation of a second action, initiated at the second device, by sending a second single transition on the single bi-directional line from the second device to the first device 906. In an aspect of the disclosure, the first single transition is distinct from the second single transition.

As used in this application, the term "action" may include, but is not limited to, an event, a triggering event, a procedure, a process, or a change of state. In an aspect of the disclosure, the first action is at least one of a reset action or a boot sequence handshake, and the second action is at least one of the reset action or the boot sequence handshake.

The apparatus triggers, at the second device, a response to the first action upon receiving the first single transition sent from the first device 908. The apparatus triggers, at the first device, a response to the second action upon receiving the second single transition sent from the second device 910.

In an aspect of the disclosure, the first single transition is at least one of a rising edge or a falling edge, and the second single transition is at least one of the rising edge or the falling edge. In another aspect of the disclosure, the first single transition sent by the first device is a rising edge and the second single transition sent by the second device is a falling edge.

FIG. 10 is a flowchart 1000 illustrating a method of signaling over a single bi-directional line. The method may be performed by a first device (e.g., apparatus 100 of FIG. 1, one of the devices 502 and 504 of FIG. 5, or apparatus 800 of FIG. 8).

The first device initiates a first action 1002. The first device indicates initiation of the first action by generating a first event on a single bi-directional line 1004. The first device receives an indication of a second action initiated at a second device by observing a second event on the single bi-directional line 1006.

As mentioned above, the term "action" may include, but is not limited to, an event, a triggering event, a procedure, a process, or a change of state. In an aspect of the disclosure, one of the first device and the second device is a power management integrated circuit (PMIC) and the other of the first device and the second device is a system-on-chip (SoC). In an aspect of the disclosure, the first action is at least one of a reset action or a boot sequence handshake, and the second action is at least one of the reset action or the boot sequence handshake. In a further aspect of the disclosure, the first action and the second action are variable depending on a state of a system that includes the first device and the second device.

The first device triggers a response to the second action upon receiving a first transition associated with the second event 1008. In an aspect of the disclosure, the triggered response is variable depending on a state of a system that includes the first device and the second device.

In an aspect of the disclosure, the first event includes a first number of pulses, and the second event includes a second number of pulses different from the first number. In a further aspect of the disclosure, the first event includes a single pulse and the second event includes a double pulse, or the first event includes the double pulse and the second event includes the single pulse. In yet another aspect of the disclosure, the first event is differentiated from the second event by a voltage level, an impedance level, a pulse width, and/or a number of pulses.

It is understood that the specific order or hierarchy of steps in the processes disclosed is an illustration of exemplary approaches. The specific order or hierarchy of steps in the processes may be rearranged based upon design preferences. The accompanying method claims present elements of the various steps in a sample order, and are not meant to be limited to the specific order or hierarchy presented.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computing device and/or distributed between two or more computing devices. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more," Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of signaling between devices, comprising:
coupling a first device to a second device via a single bi-directional line;
observing a first fault condition at the first device;
initiating a first state change at the first device based on the first fault condition;
indicating initiation of the first state change by sending a first single line transition on the single bi-directional line from the first device to the second device; and
triggering the first state change at the second device upon receiving the first single line transition sent from the first device.

2. The method of claim 1, further comprising:
observing a second fault condition at the second device;
initiating a second state change at the second device based on the second fault condition;
indicating initiation of the second state change by sending a second single line transition on the single bi-directional line from the second device to the first device; and
triggering the second state change at the first device upon receiving the second single line transition sent from the second device.

3. The method of claim 2, wherein the first single line transition is at least one of a rising edge or a falling edge, and the second single line transition is at least one of the rising edge or the falling edge.

4. The method of claim 2, wherein the first single line transition sent by the first device is a rising edge and the second single line transition sent by the second device is a falling edge.

5. The method of claim 1, wherein one of the first device and the second device is a power management integrated circuit (PMIC) and the other of the first device and the second device is a system-on-chip (SoC).

6. The method of claim 2, wherein:
the first state change is at least one of a reset action or a boot sequence handshake; and
the second state change is at least one of the reset action or the boot sequence handshake.

7. An apparatus for signaling between devices, comprising:
a first device;
a second device; and
a single bi-directional line coupling the first device to the second device,
wherein the first device observes a first fault condition, initiates a first state change based on the first fault condition, indicates initiation of the first state change by sending a first single line transition on the single bi-directional line to the second device, and
wherein the second device triggers the first state change at the second device upon receiving the first single line transition sent from the first device.

8. The apparatus of claim 7, wherein:
the second device observes a second fault condition at the second device, initiates a second state change based on the second fault condition, and indicates initiation of the second state change by sending a second single line transition on the single bi-directional line from the second device to the first device; and
the first device triggers the second state change at the first device upon receiving the second single line transition sent from the second device.

9. The apparatus of claim 8, wherein the first single line transition is at least one of a rising edge or a falling edge, and the second single line transition is at least one of the rising edge or the falling edge.

10. The apparatus of claim 8, wherein the first single line transition sent by the first device is a rising edge and the second single line transition sent by the second device is a falling edge.

11. The apparatus of claim 7, wherein one of the first device and the second device is a power management integrated circuit (PMIC) and the other of the first device and the second device is a system-on-chip (SoC).

12. The apparatus of claim 8, wherein:
the first state change is at least one of a reset action or a boot sequence handshake; and
the second state change is at least one of the reset action or the boot sequence handshake.

13. A method of signaling at a first device, comprising:
observing a fault condition at the first device;
initiating a first state change based on the fault condition;
indicating initiation of the first state change by generating a first type of line transition on a single bi-directional line;
receiving an indication of a second state change initiated at a second device by observing a second type of line transition on the single bi-directional line; and
triggering the second state change at the first device upon receiving a first line pulse associated with the second type of line transition at the first device.

14. The method of claim 13, wherein the second device triggers the first state change upon receiving a first line pulse associated with the first type of line transition at the second device.

15. The method of claim 13, wherein the triggered second state change is variable depending on a state of a system that includes the first device and the second device.

16. The method of claim 13, wherein:
the first type of line transition includes a first number of line pulses; and
the second type of line transition includes a second number of line pulses different from the first number.

17. The method of claim 16, wherein:
the first type of line transition includes a single line pulse and the second type of line transition includes a double line pulse, or
the first type of line transition includes the double line pulse and the second type of line transition includes the single line pulse.

18. The method of claim 13, wherein the first type of line transition is differentiated from the second type of line transition by at least one of:
a voltage level;
an impedance level;
a line pulse width; or
a number of line pulses.

19. The method of claim 13, wherein one of the first device and the second device is a power management integrated circuit (PMIC) and the other of the first device and the second device is a system-on-chip (SoC).

20. The method of claim 13, wherein:
the first state change is at least one of a reset action or a boot sequence handshake; and
the second state change is at least one of the reset action or the boot sequence handshake.

21. The method of claim 13, wherein the first state change and the second state change are variable depending on a state of a system that includes the first device and the second device.

22. A first device, comprising:
a memory; and
a processing circuit coupled to the memory and configured to:
observe a fault condition,
initiate a first state change based on the fault condition,
indicate initiation of the first state change by generating a first type of line transition on a single bi-directional line,
receive an indication of a second state change initiated at a second device by observing a second type of line transition on the single bi-directional line, and
trigger the second state change at the first device upon receiving a first line pulse associated with the second type of line transition at the first device.

23. The first device of claim 22, wherein the second device triggers the first state change upon receiving a first line pulse associated with the first type of line transition at the second device.

24. The first device of claim 22, wherein the triggered second state change is variable depending on a state of a system that includes the first device and the second device.

25. The first device of claim 22, wherein:
the first type of line transition includes a first number of line pulses; and
the second type of line transition includes a second number of line pulses different from the first number.

26. The first device of claim 25, wherein:
the first type of line transition includes a single line pulse and the second type of line transition includes a double line pulse, or
the first type of line transition includes the double line pulse and the second type of line transition includes the single line pulse.

27. The first device of claim 22, wherein the first type of line transition is differentiated from the second type of line transition by at least one of:
a voltage level;
an impedance level;
a line pulse width; or
a number of line pulses.

28. The first device of claim 22, wherein one of the first device and the second device is a power management integrated circuit (PMIC) and the other of the first device and the second device is a system-on-chip (SoC).

29. The first device of claim 22, wherein:
the first state change is at least one of a reset action or a boot sequence handshake; and
the second state change is at least one of the reset action or the boot sequence handshake.

30. The first device of claim 22, wherein the first state change and the second state change are variable depending on a state of a system that includes the first device and the second device.

* * * * *